US007032048B2

(12) United States Patent
Appleby et al.

(10) Patent No.: US 7,032,048 B2
(45) Date of Patent: Apr. 18, 2006

(54) METHOD, SYSTEM, AND PROGRAM PRODUCTS FOR DISTRIBUTED CONTENT THROTTLING IN A COMPUTING ENVIRONMENT

(75) Inventors: Karen Appleby, Ossining, NY (US); Liana Liyow Fong, Irvington, NY (US); German Sergio Goldszmidt, Dobbs Ferry, NY (US); Srirama Mandyam Krishnakumar, White Plains, NY (US); Donald Philip Pazel, Montrose, NY (US)

(73) Assignee: International Business Machines Corporation, Armonk, NY (US)

( * ) Notice: Subject to any disclaimer, the term of this patent is extended or adjusted under 35 U.S.C. 154(b) by 465 days.

(21) Appl. No.: 09/916,513

(22) Filed: Jul. 30, 2001

(65) Prior Publication Data

US 2003/0023798 A1    Jan. 30, 2003

(51) Int. Cl.
*G06F 13/14*    (2006.01)
(52) U.S. Cl. .................. 710/240; 710/309; 370/230
(58) Field of Classification Search ........ 710/240–244, 710/100, 309; 709/226, 225, 229, 235, 200, 709/202–204; 718/105; 370/230–235
See application file for complete search history.

(56) References Cited

U.S. PATENT DOCUMENTS

| 5,864,870 | A | 1/1999 | Guck |
| 5,918,017 | A | 6/1999 | Attanasio et al. |
| 5,926,798 | A | 7/1999 | Carter |
| 5,961,602 | A | 10/1999 | Thompson et al. |
| 6,006,264 | A * | 12/1999 | Colby et al. ............... 709/226 |
| 6,067,559 | A | 5/2000 | Allard et al. |
| 6,073,241 | A | 6/2000 | Rosenberg et al. |
| 6,434,609 | B1 * | 8/2002 | Humphrey ................ 709/218 |
| 6,480,881 | B1 * | 11/2002 | Kubota et al. ............. 709/202 |
| 6,526,448 | B1 * | 2/2003 | Blewett .................... 709/238 |
| 6,598,071 | B1 * | 7/2003 | Hayashi et al. ........... 709/203 |
| 6,667,956 | B1 * | 12/2003 | Beshai et al. ............. 370/238 |
| 6,839,767 | B1 * | 1/2005 | Davies et al. ............. 709/232 |
| 2001/0049727 | A1 * | 12/2001 | Mukherjee et al. ....... 709/219 |
| 2002/0091825 | A1 * | 7/2002 | Shuster .................... 709/226 |

OTHER PUBLICATIONS

Boivie et al. "System and Method for Enforcing Communications Bandwidth Based Service Level Agreements to Plurality of Customers Hosted on a Clustered Web Service", U.S. Appl. No. 09/943,207.
Appleby-Hougham et al., "Highly Scalable System and Method of Regulating Internet Traffic to Server Farm To Support (MIN, MAX) Bandwidth Usage-Based Service Level Agreement", U.S. Appl. No. 09/543,207.

* cited by examiner

*Primary Examiner*—Rehana Perveen
*Assistant Examiner*—Kim T. Huynh
(74) *Attorney, Agent, or Firm*—McGinn IP Law Group, PLLC; Douglas W. Cameron, Esq.

(57) ABSTRACT

A method (and structure) in a computer network of controlling the admittance of requests to at least one processing component, includes differentiating the type of received requests based on the message content in each request. Each request is admitted only if the differentiated type meets at least one criterion for admission.

27 Claims, 7 Drawing Sheets

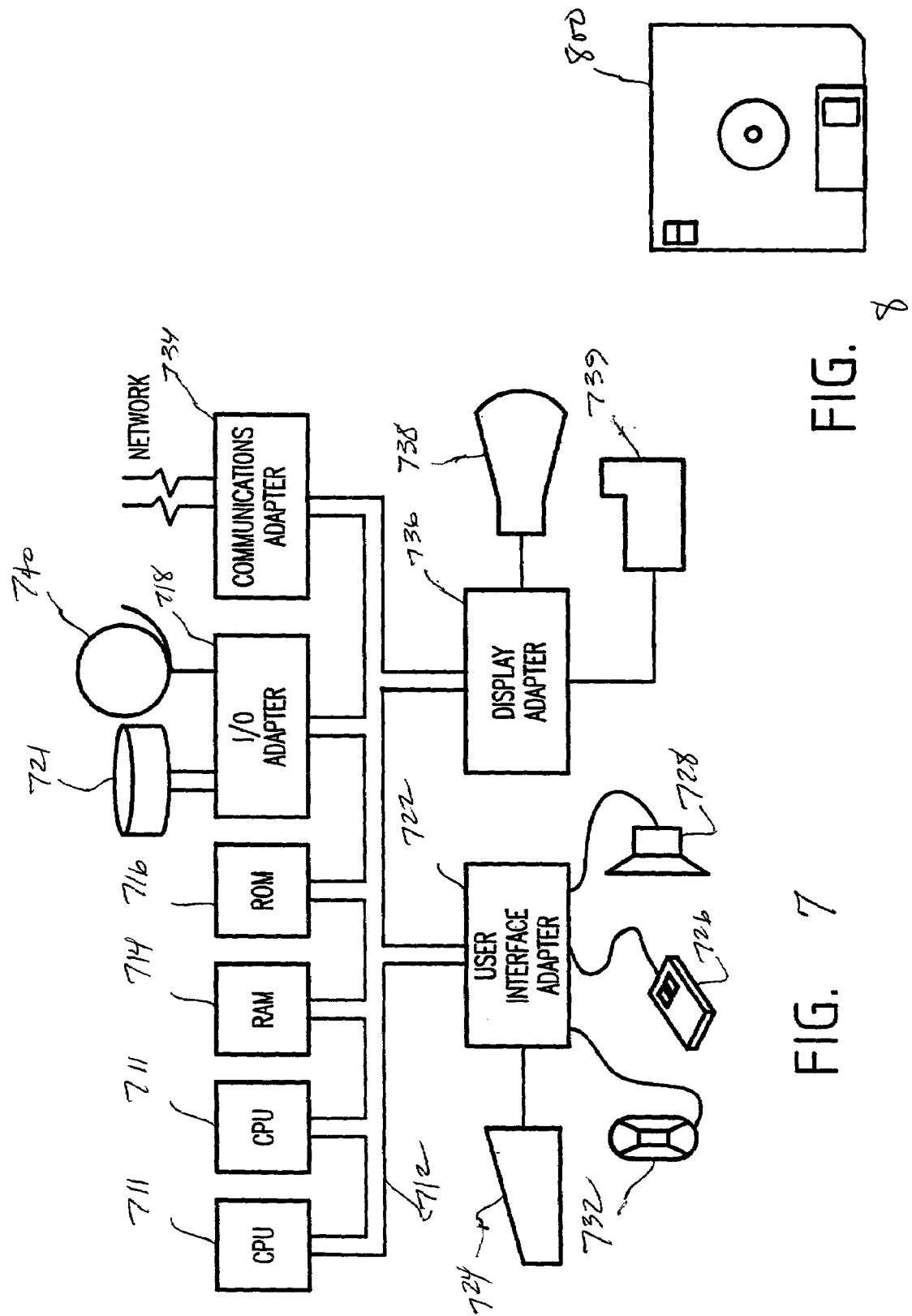

METHOD, SYSTEM, AND PROGRAM PRODUCTS FOR DISTRIBUTED CONTENT THROTTLING IN A COMPUTING ENVIRONMENT

FIELD OF THE INVENTION

The present invention generally relates to managing load on specific components in a web server farm. More specifically, it allocates the Internet load for web components such as application components using Enterprise Java Beans® (EJB), databases, servlets, etc., in a server farm by controlling the admittance of requests based on the content of the request. Additionally, the method uses the distributed processing capability inherent in the web serving environment to limit the impact on overall system performance.

DESCRIPTION OF THE RELATED ART

The main function of a web server farm is to serve HTML (Hyper Text Markup Language) web pages to clients using web browsers such as Netscape® or Internet Explorer®. The HTML pages are generated at a component known as the web server. The web server generates the pages by processing the HTTP (Hyper Text Transfer Protocol) requests made by the web browser clients. The HTTP request includes the web page identifier in the form of a URL (uniform request locator) and possibly several other parameters such as cookies that could be used by the web server. The web server processes the requests by either fetching the web pages from a local repository that could be on a hard drive or by passing the request to an external component that may generate the web page. Examples of these external components are application servers, CGI (Common Gateway Interface) scripts etc. These components may be located on a different hardware platform from the web server.

An example of this type of request would be a request to display the cost items in a shopping cart. The external module in this case may interact with a backend database server to obtain the cost of the items. It then creates a HTML web page customized for this request and sends the page back to the web server. A web server farm includes a heterogeneous mix of components such as web servers, application servers, database servers, etc., that perform different functions. These components may run on different types of hardware platforms, typically just referred to as servers, with different capabilities such as amount of memory, processor speed, and type.

The servers are physically interconnected by networks which are in turn connected to the Internet. FIG. 1 shows an example of a conventional web server farm. The servers are logically connected in a tiered manner such that one or more web servers 30 forming the outermost tier are followed by the application servers 40 and database servers 50.

The web browsers make a TCP connection request to the web server via the Internet 10 and send the HTTP request on this connection. Some networks could have IP L4LB (Layer 4 Load Balancing) components 20 which distribute the incoming TCP connections from the web browsers to the web servers that are on the network. When the web browser makes a TCP connection request, the L4LB 20 redirects the request to a web server 30 that is capable of handling the request. The web server then processes this request as explained above.

One problem with IP layer 4 based load balancing is that it does not look at the payload of the data and there is no differentiation among requests. That is, there is no differentiation between a request for a static web page that is stored in a repository such as a disk and a request to create a dynamic page by obtaining information from a backend database. This leads to the following problems when connection requests are subjected to admission control at the dispatcher level.

First, requests for static pages that are relatively small and impose very little load on the system could get dropped. This is related to the way in which the IP L4 load balancers work. The L4LB's use the TCP header that initiates a connection to determine admission. A request to fetch a web page is sent on a TCP connection. Furthermore, there could be many HTTP requests that could be sent on a TCP connection.

Second, this method could cause web site outages as the requests to overloaded components do not get sufficiently throttled, thereby causing them to crash. For purposes of the present Application, "throttling" means a method of dropping requests when the load on the processing component increases.

A web server farm includes a finite number of computing resources that are shared for processing requests from web clients. Different clients need different functions such as obtaining a static web page or obtaining a list of items in a catalog that is typically handled by a servlet or an EJB. These functions impose different loads on the various computing resources and the functions have varying levels of importance for the business that is hosting the web site.

The current state of the art treats all the requests to be of equal priority and processes the requests in the order in which they arrive. If there is an overload on the overall system, then requests are simply dropped by the L4LB. However, businesses that are conducted over the Internet suffer from this approach as there is no priority-based dropping of the request. For example, a customer who is requesting a web page to submit his credit number for processing is clearly more important than a customer requesting to view the picture of an item in the catalog.

SUMMARY OF THE INVENTION

The problem with the L4LB's discussed above is that they reject or accept connection requests as opposed to HTTP requests. An analogy that could be used here is the following.

Assume that there is a boat that can sustain a certain weight. When the boat is getting to be nearly full, then it makes sense to admit only light weight people instead of closing the entry to the boat itself The TCP connection can be thought of as the entry into the boat. The subject of the present invention (e.g., content-based throttling) can be thought of as a "smart" gate keeper who lets people through based on the weight of the people.

In view of the foregoing and other problems, an object of the present invention is to provide a structure and method for distributed throttling which improves the efficiency of a computer network, especially in web hosting server farms.

It is another object of the present invention to provide a structure and method to improve throughput of backend servers due to improved load management.

It is another object of the present invention to prevent crashes of Internet server farms and to provide feedback to a requester that a current request has been rejected.

In order to achieve the above objects and goals, according to a first aspect of the present invention, herein is described a method in a computer network of controlling the admittance of requests to at least one processing component, including differentiating the type of the requests based on the content in each request and admitting the request only if the differentiated type meets at least one criterion for admission.

According to another aspect of the invention, herein is described a method of controlling the admittance of requests to at least one processing component in a distributed heterogeneous computing environment, each request including a direction component and a message component, the method including receiving a request, evaluating at least a part of the message component of the received request, and providing an admission of the received request based on this evaluation.

According to another aspect of the present invention, herein is described a request throttler in a computer network that controls an admittance of requests to at least one processing component, where the request throttler includes a differentiator to evaluate the message content of each incoming request and a switch to admit each request only if the evaluation passes at least one criterion for admission.

According to another aspect of the present invention, herein is described a computer-readable medium containing computer-readable instructions for a request throttler in a computer network that controls an admittance of requests to at least one processing component, where the request throttler includes a differentiator to evaluate the message content of each of the requests and a switch to admit each request only if the evaluation passes at least one criterion for admission.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

The present invention relates to managing load on specific components in a web server farm. As described above, a web server farm includes a heterogeneous mix of components with different capabilities and perform different functions such as a web serving, database serving, application serving, etc. These components are typically structured in a tiered manner so that requests flow from one tier to the other.

Figure 1:
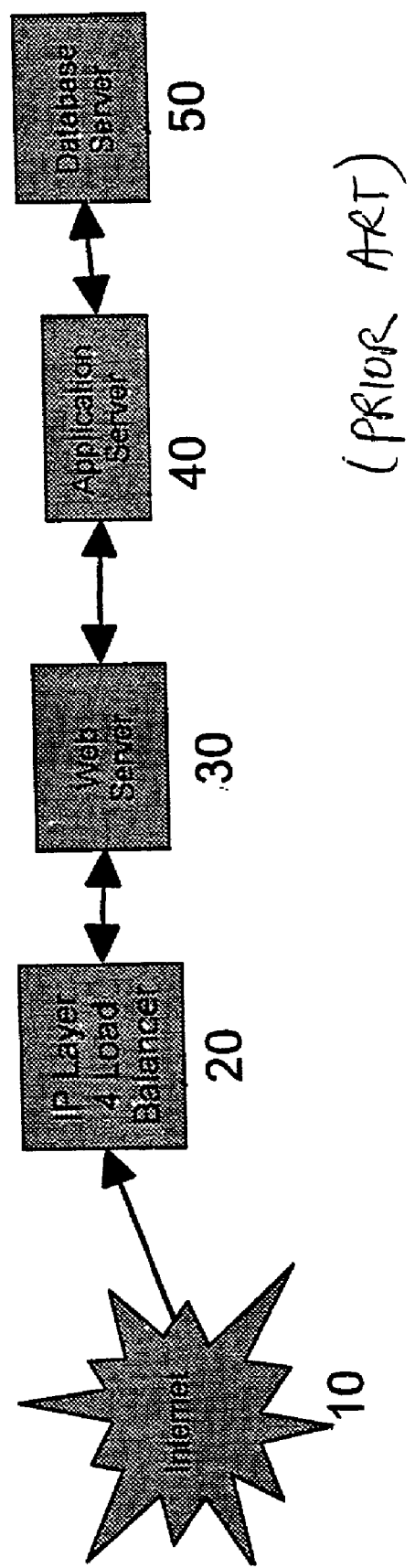
FIG. 1 illustrates an example of the logical configuration of a conventional web server farm.
Figure 2:
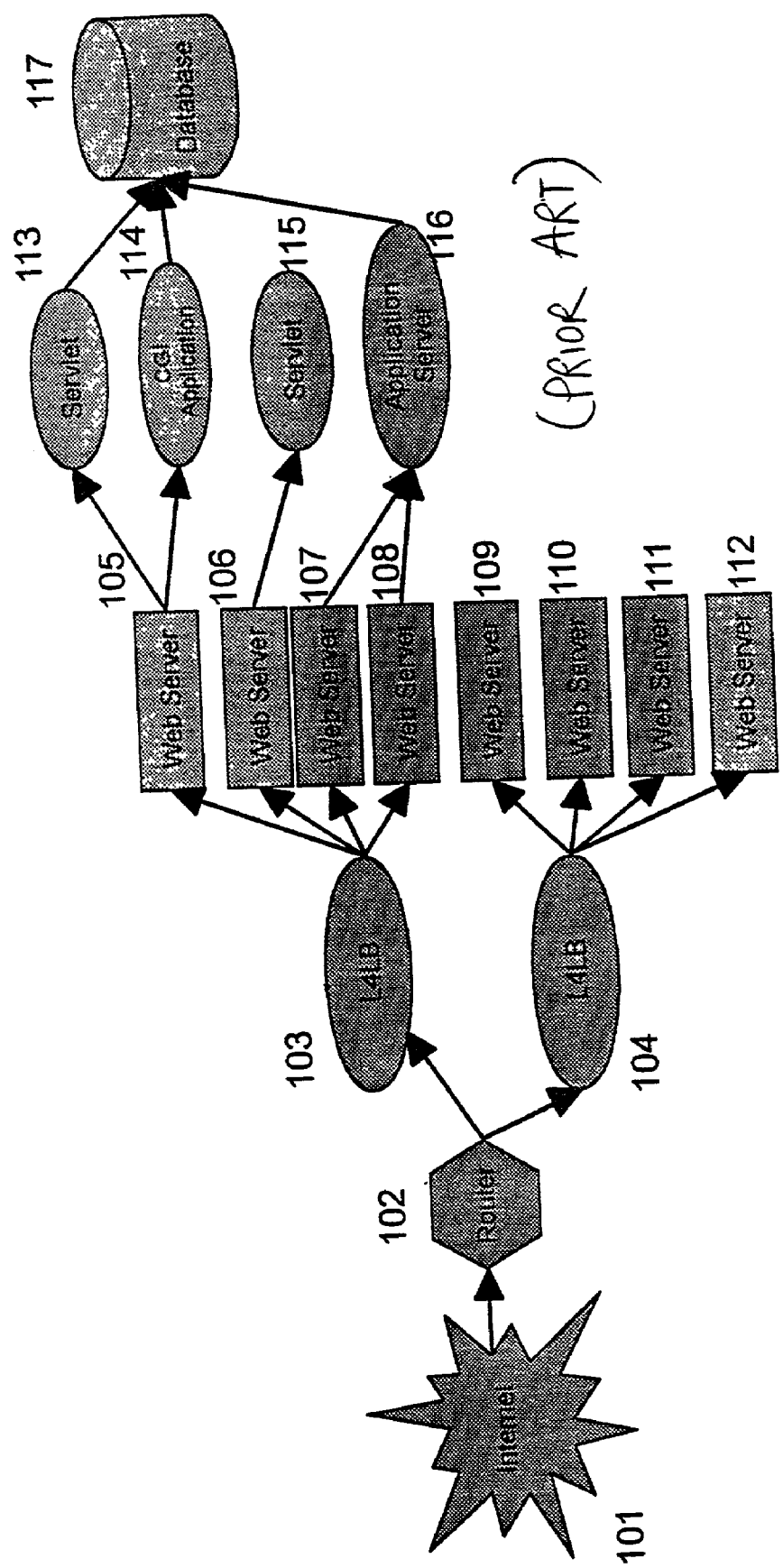
FIG. 2 illustrates a typical exemplary conventional web server farm.

FIG. 2 shows an exemplary conventional web server farm. Requests for performing tasks typically arrive into the farm from the Internet 101. The Internet 101 forwards the request into the router 102, which is typically located at the entry to the farm or at a location in the Internet Service Provider's point of presence. The router uses the IP address contained in the incoming packet to route the request to one of the L4LBs 103,104. The L4LB provides a virtualization of the IP addresses of all the servers that are connected to it. The L4LB distributes the TCP connection requests using weights assigned to the web servers 105–112 that are connected to it. This distribution is typically done during the arrival of a TCP connection and not during each individual HTTP 1.1 request made on the connection.

In this typical configuration, servlets 113, 115 might process certain of the requests. These servlets are typically written in Java® and run in a Java Virtual Machine container such as a Websphere application server, JServ or TomCat. Certain types of requests might be processed by CGI bin application 114. Application server 116 might contain components such as Enterprise Java Beans used to perform business logic functions. Database 117 contains data that is critical to the processing of requests served by the other components such as the servlet or application server.

Figure 3:
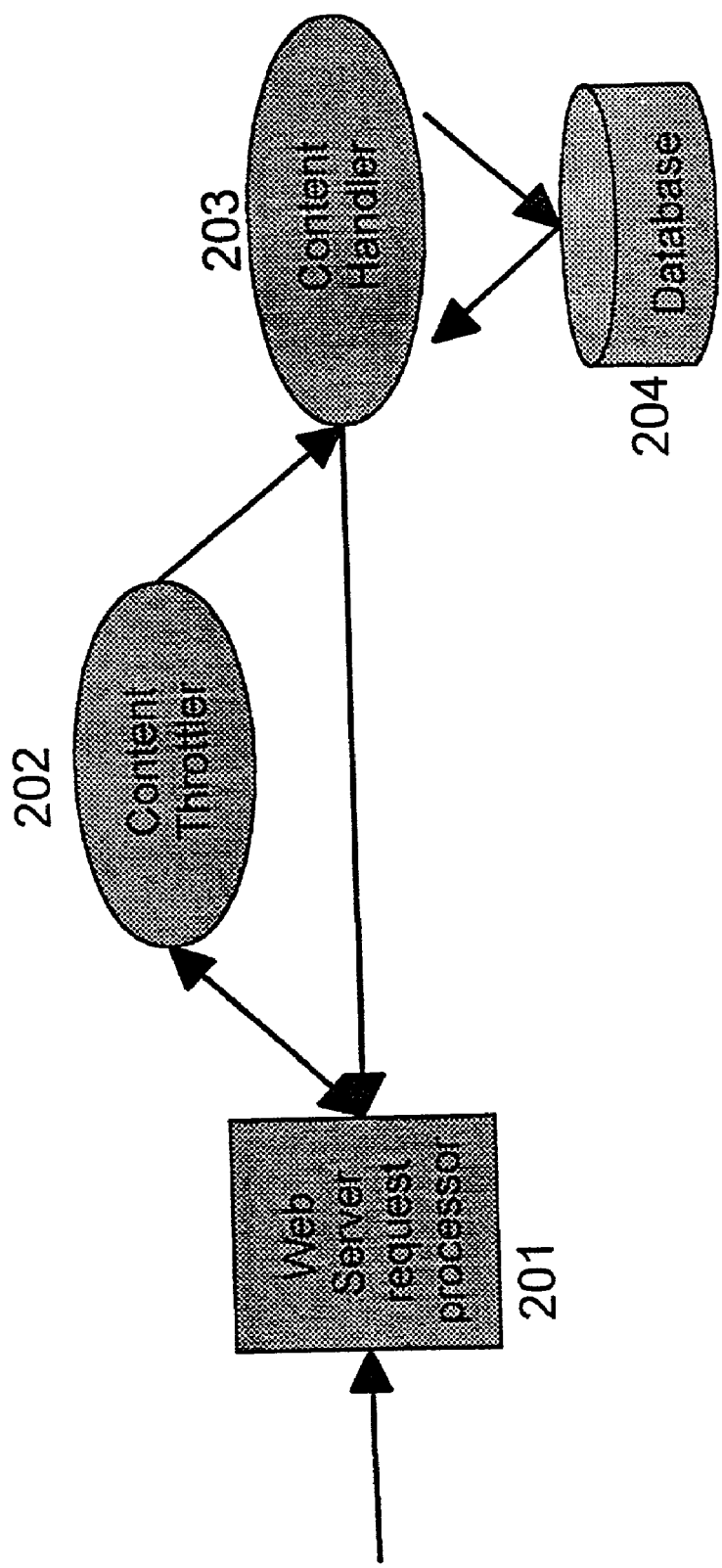
FIG. 3 illustrates the concept of throttling in a web server.

FIG. 3 depicts one exemplary embodiment of the present invention by showing a possible organization of components in a web serving environment that supports content based throttling. Web server 201 serves as a request processor at which the requests arrive after they have been dispatched by the L4LB 103, 104. Thus, web server 201 might correspond to a web server 105–112 shown in FIG. 2. In this exemplary embodiment, the web server request processor 201, content throttler 202, and content handler 203 are all implemented as part of the web server 105–112. Because of this repetitive installation throughout the web server farm, the invention additionally can have a distributive aspect.

Web servers 105–112 typically provide a feature where one can plug in software components that are typically not part of the original web server. These components can be interposed in the request processing phases of the web server to provide additional functionality or modify the functionality provided by the base web server. Such software modules are referred to as "plugins" and are common in the art. The content throttler 202 can be implemented as a plugin in this embodiment. While the content handler 202 could be typically a part of the core web server, it can be replaced by a plugin that can process specific types of requests. An example of such a scenario would be a function that replaces a file handler for a streaming video image with a custom page handler only when the bandwidth utilization is high.

The request processing in a web server 105–112 typically includes inspecting the URL of a received request and determining the content handler that can process the request based on the type of the request. In contrast, the conventional method has only the following steps in a web server: determine the type of request based only the URL, and, select the content handler that would handle the request (the web server configuration provides the information required for mapping the request type to the content handler).

Thus, the method of the present invention interposes an additional step that determines whether or not the request needs to be sent to the content handler based on the "content" of the request (i.e., the complete payload of the request such as information in the POST request). A request type is identified by the configuration information that is present in the web server configuration. Requests can be broadly classified into static and dynamic requests. Static requests are requests for information that are contained in a static repository such as HTML file or a GIF image file.

Dynamic requests are for information that has to be constructed as a response to the request. Dynamic requests cannot be simply stored in a repository and presented to the user when the request has been made. Typical examples of dynamic requests are for information such as items in the shopping cart of a client or information about the stock portfolio of the client.

The web server configuration contains information that maps the type of request with the content handler that can process the request. Currently, the only web server configuration that maps the type of request to a content handler is based only on the URL. The content handler then processes the request by performing the necessary tasks to deliver the content requested. If the request is for a static HTML file or a GIF image it obtains the file by making an operating system dependent call to get the file and delivers the file on the connection that has been established between the web server and the client's web browser. If the request is for obtaining the items in the shopping cart of a client, then the content handler may initiate a query to a backend database to fetch the items in the catalog, construct a HTML web page with the result of the query after formatting the web page suitably, and deliver the page to the web browser client on the connection that has been established between the browser and the server.

Figure 4:
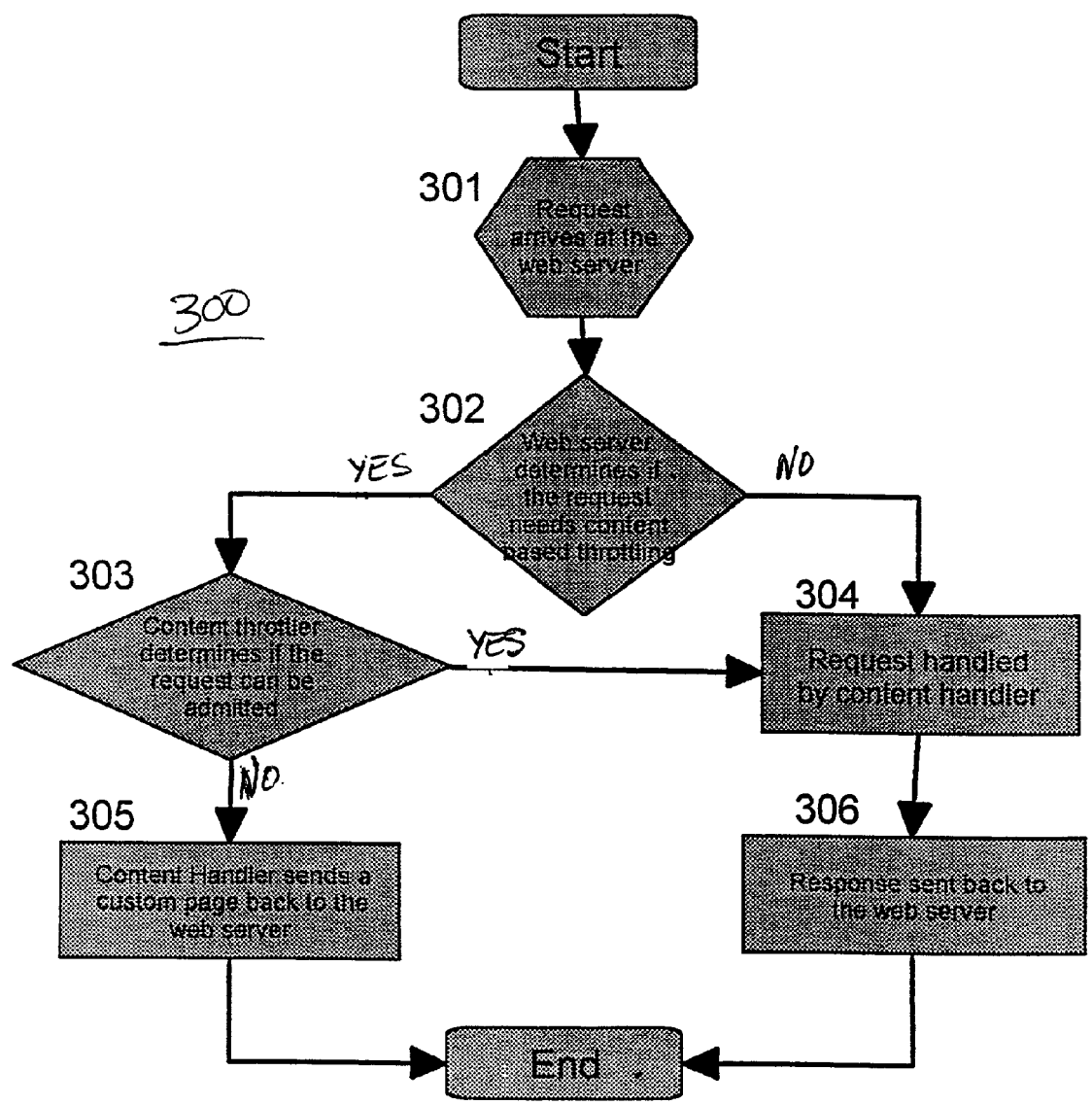
FIG. 4 is a flowchart illustrating one aspect of a preferred embodiment of content-based throttling of the present invention.

FIG. 4 depicts a process 300 of content based throttling in a web serving environment according to a preferred embodiment of the invention. At step 301, a request arrives at the web server request processor 201 (FIG. 3) after a connection has been established.

At step 302, the web server 105–112 (FIG. 2) determines if the request should be subjected to content based throttling. This process is explained further in the following sections and in FIG. 5. A key factor in this determination is the current activity of the web farm. For example, if traffic is light, then there is obviously no need for throttling.

If it is determined that the request does not need to be throttled, then the request is simply handed over to the content handler, and at step 304, the content handler 203 (FIG. 3) produces the content, such as a HTML page that contains a description of the items in a shopping catalog. In this example, database 204 (FIG. 3) storing the shopping catalog information would be consulted by content handler 203 (FIG. 3) to create the HTML page. In step 306, the response is sent back to the web server.

If the request needs to be throttled due to high current traffic or other criterion used for the throttling threshold decision, then the web server hands over the request to the content throttler 202 (FIG. 3). In step 303 (FIG. 4), the content throttler 202 determines whether a request should be processed, based on one or more or a combination of such metrics such as load on the content handler, load on the database, load on the server that is running the application components, or available bandwidth. Other metrics might be appropriate for specific applications and would be apparent to one skilled in the art. A simple scenario illustrating the concept is discussed below relative to FIG. 6.

If the content throttler determines that the request should not be processed, then it sends back a custom page in step 305 (FIG. 4) to the web server. This page could contain information that describes that the web site is experiencing peak load and the user at the browser could try a while later.

If the content throttler determines that the request could be admitted, then it hands the request to the content handler to process the request in step 304. Either way, the web server obtains the content that is obtained by the content handler (step 306) or the content throttler (step 305) and sends the response back to the browser that originated the request.

Figure 5:
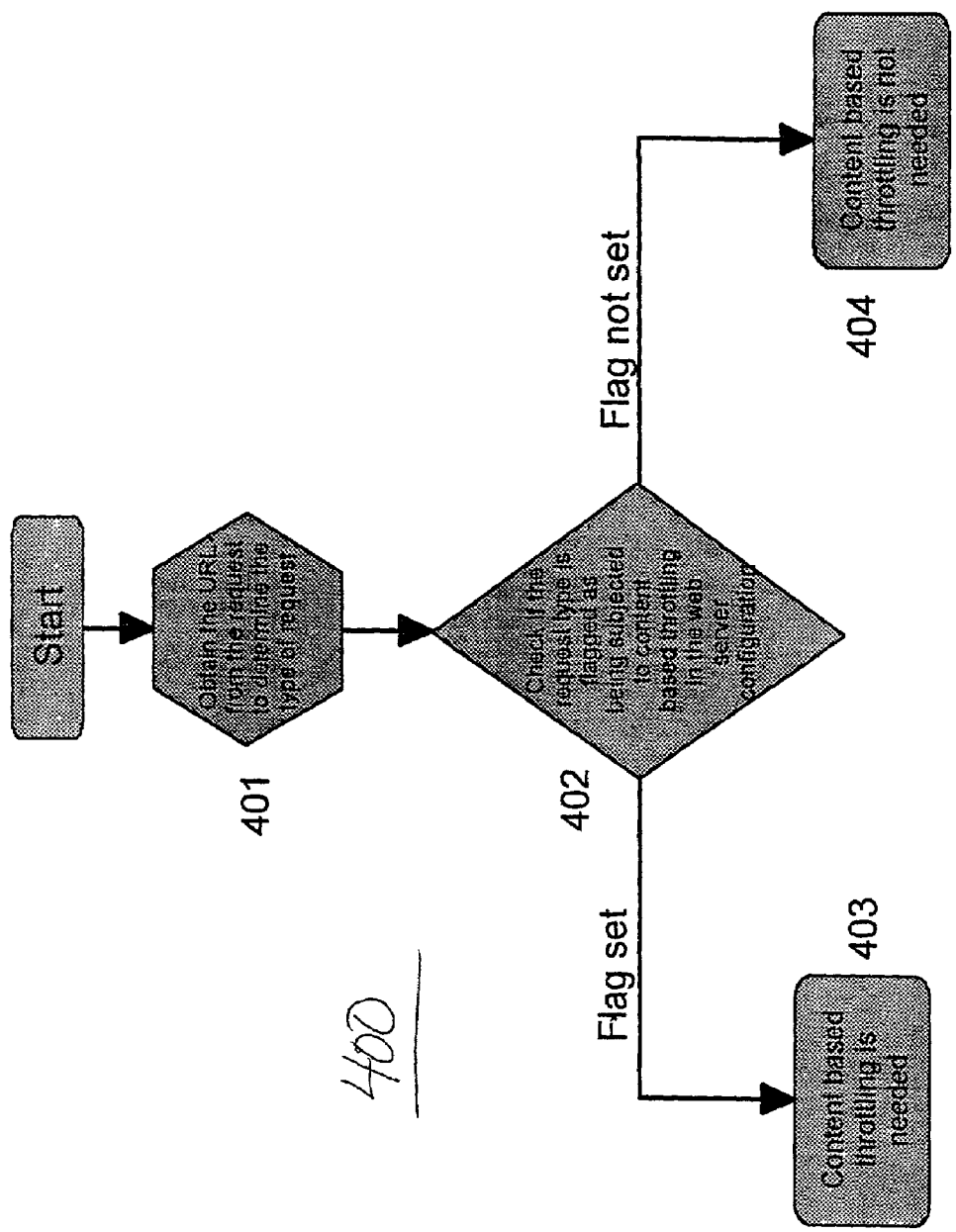
FIG. 5 is a flowchart illustrating a second aspect of a preferred embodiment of a method for content-based throttling of the present invention.

FIG. 5 provides a simple exemplary technique 400 of the step that determines if a request needs to be subjected to content based throttling. As mentioned above, in a preferred embodiment of the invention, this determination is relevant only if traffic on the farm has exceeded a preselected threshold. In step 401, the web server determines the type of the request based on the URL in the request and the web server configuration. There is a mapping in the web server configuration that contains the plugins that perform additional processing on request of certain types.

The web server checks in step 402 if the request type is flagged to be processed by the content-based throttler. If the flag is set, then this request needs to be subjected to content based throttling (step 403). If the flag is not set, then there is no need to subject the request to content based throttling (step 404).

Figure 6:
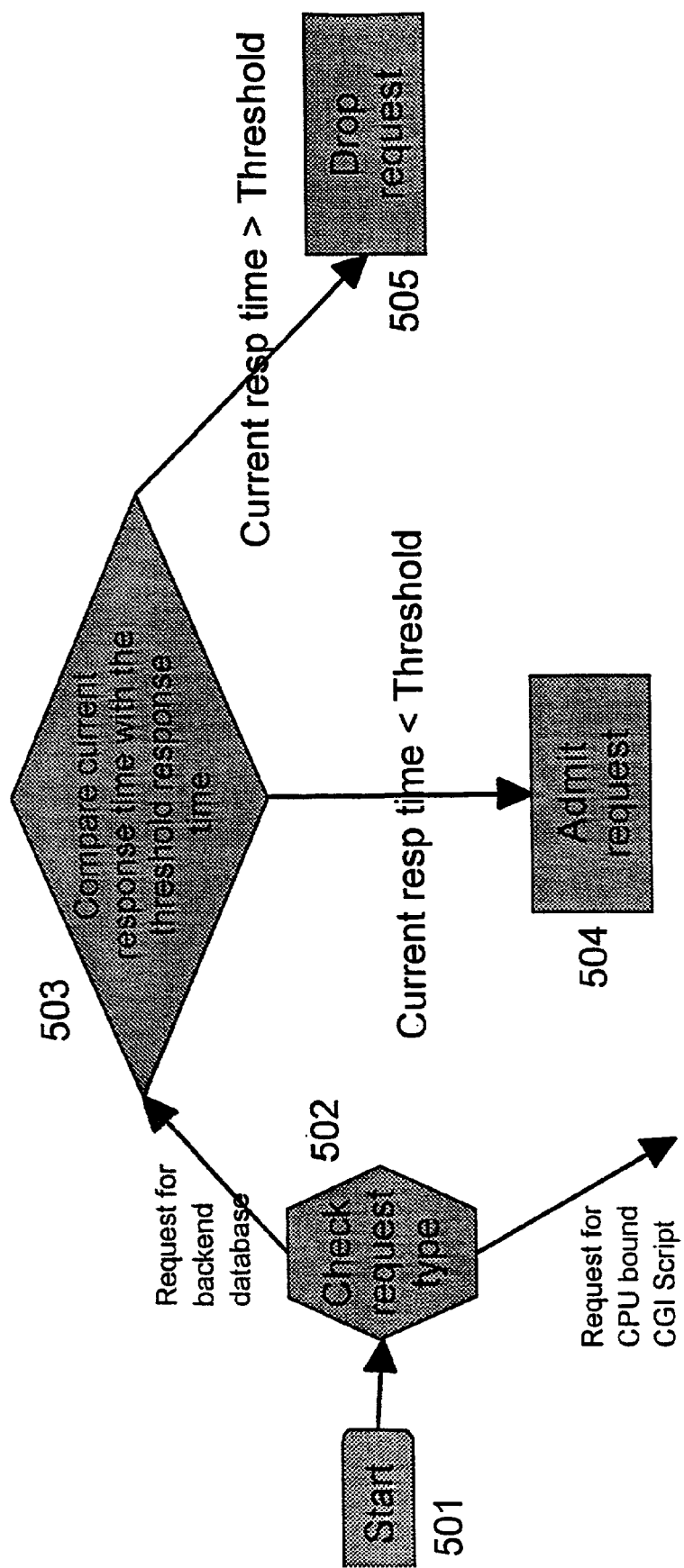
FIG. 6 is a flowchart illustrating an exemplary decision process of the content-based throttling of the present invention.
Figure 1:
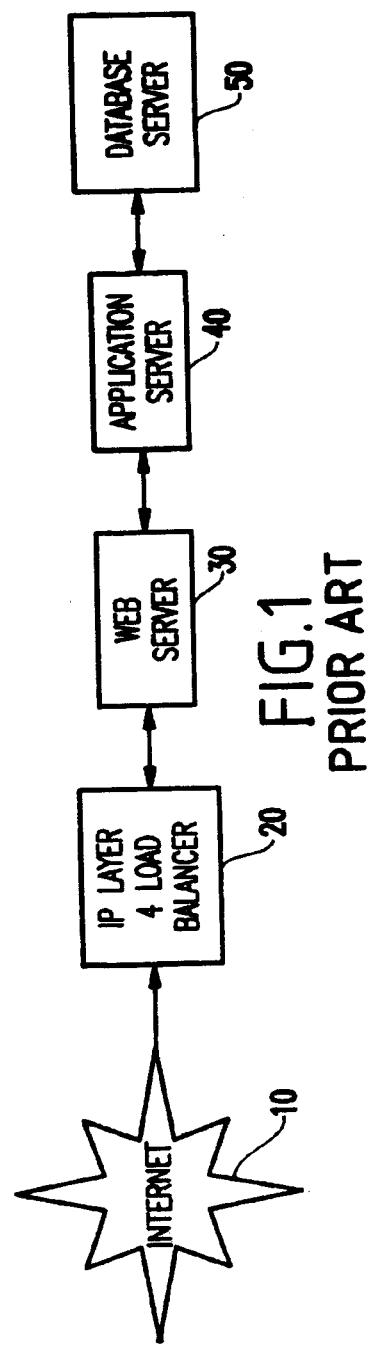
Figure 2:
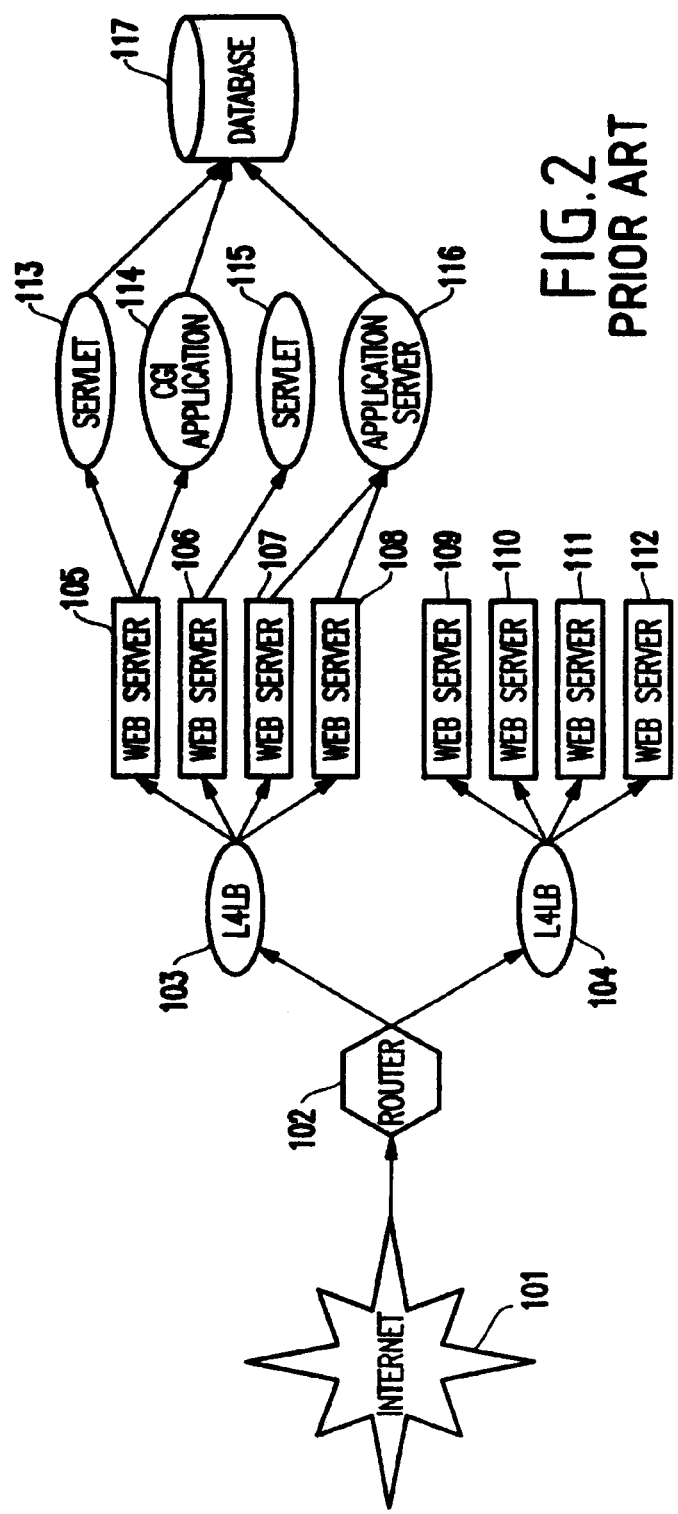
Figure 3:
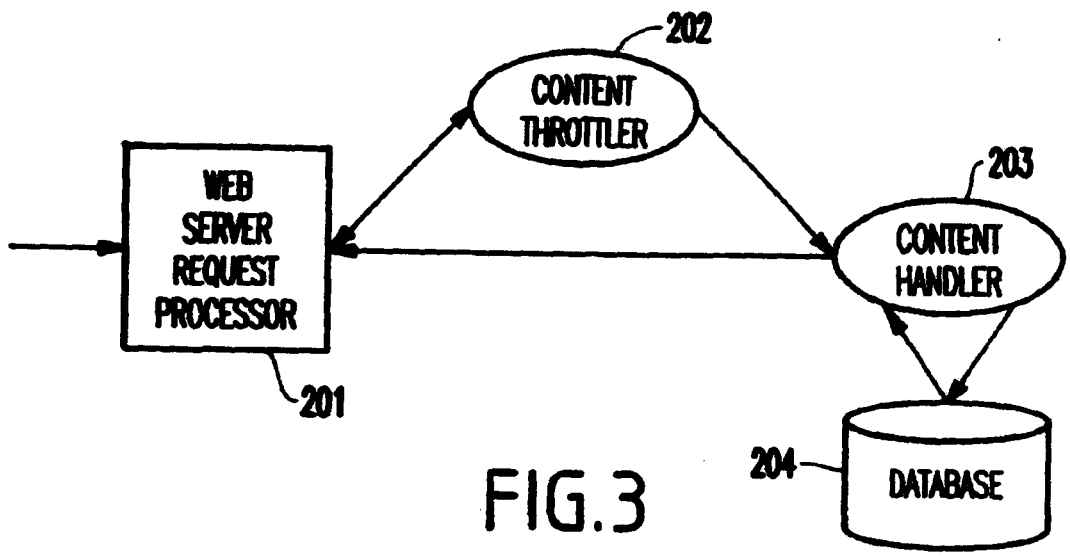
Figure 4:
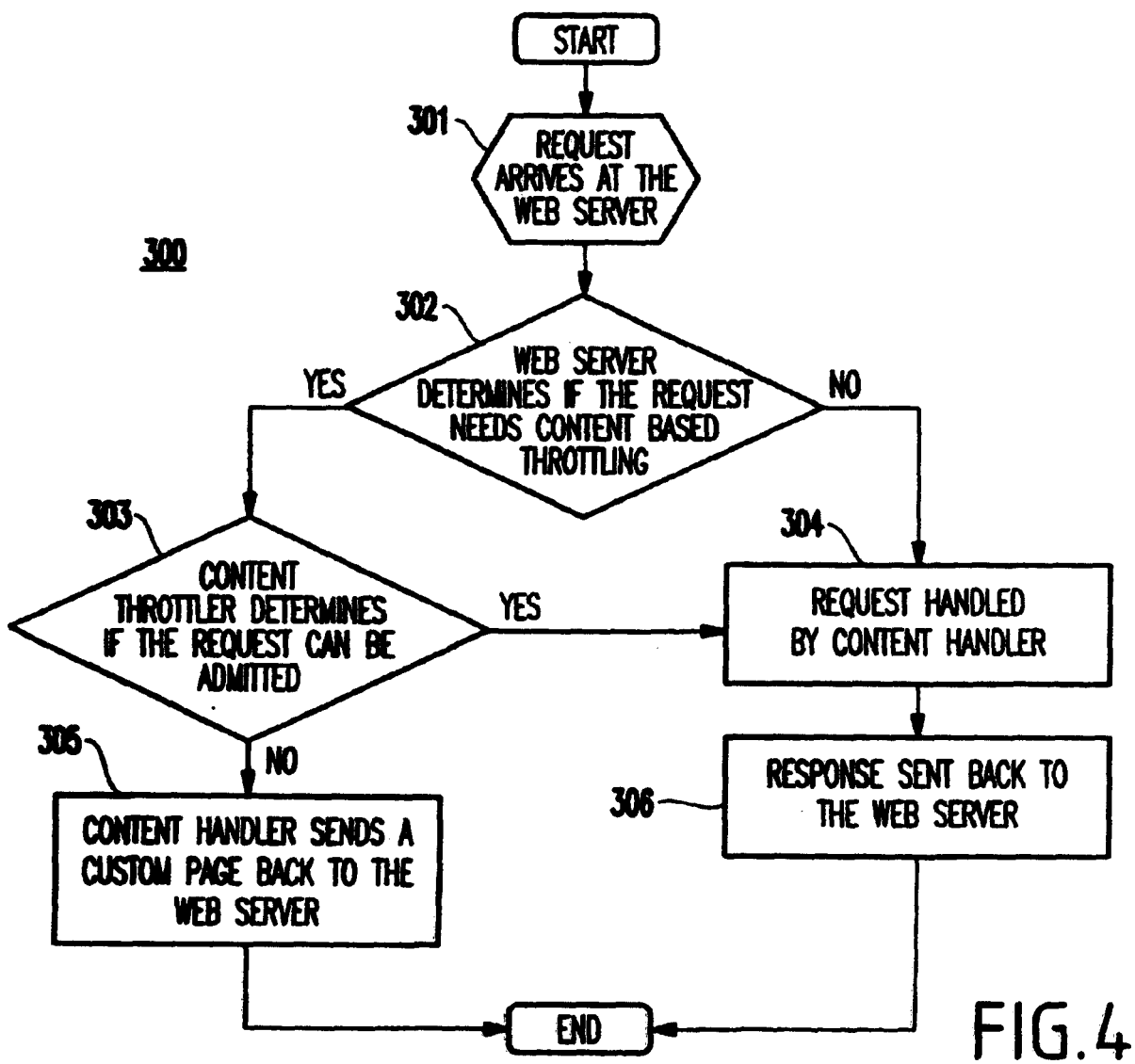
Figure 5:
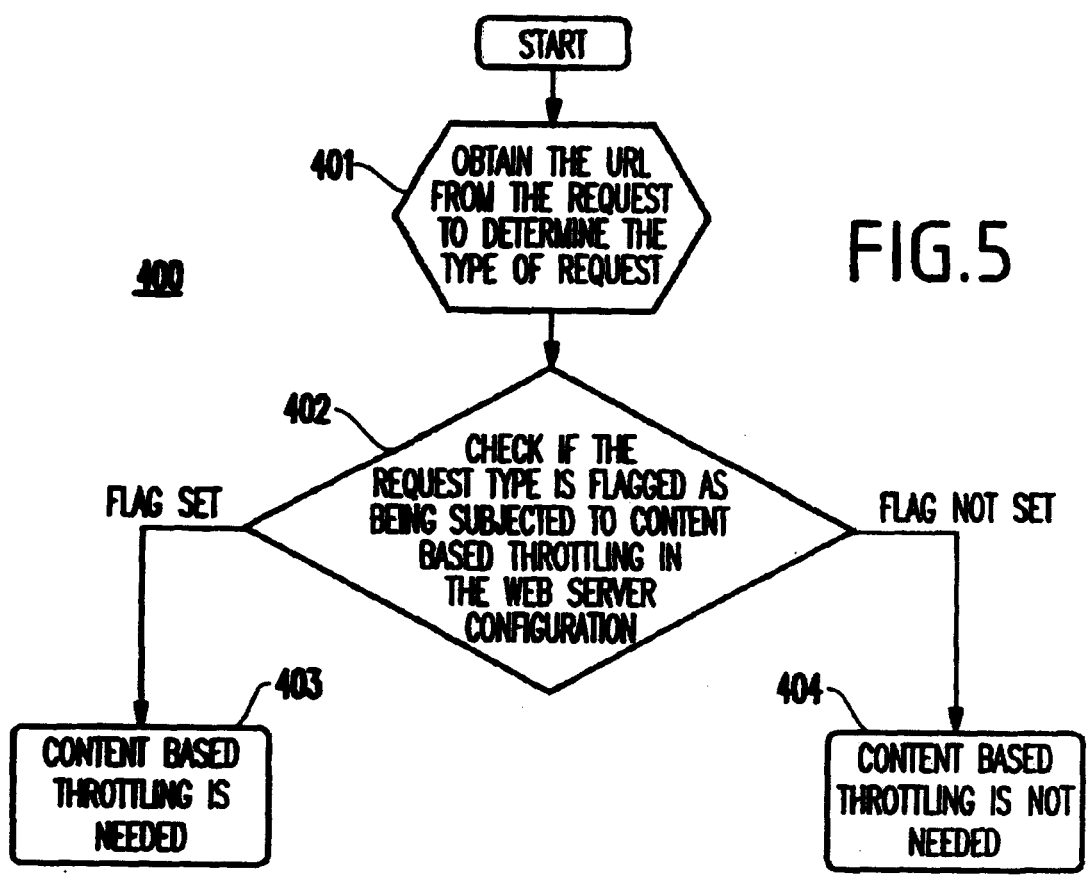
Figure 6:
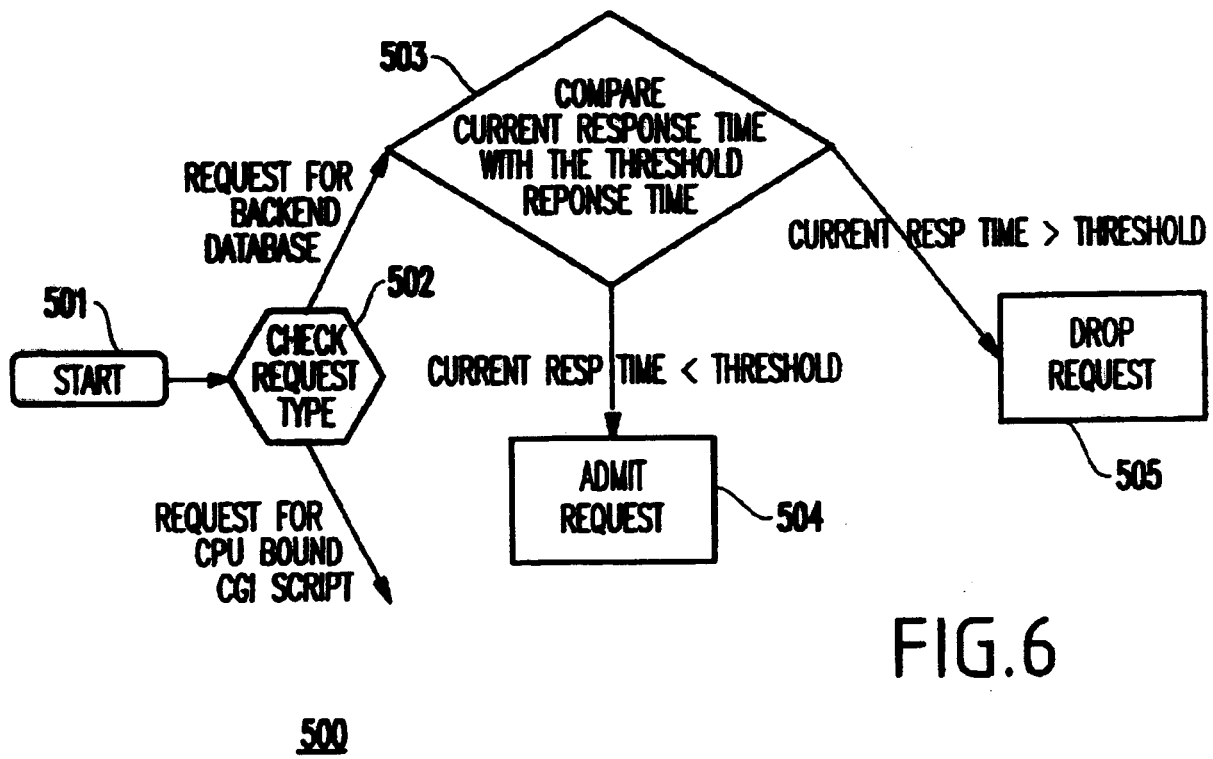

FIG. 6 depicts an exemplary decision process 500 for content based throttling, as done by content throttler 202 (FIG. 3). The request is identified by making use of the configuration information in the web server configuration and matching it against the load parameter that is monitored. In the example shown in FIG. 6, the request is identified as being for a backend database.

As shown in this example, in step 502, the request is associated with the response time as the load parameter. There is a threshold for the response time that has been set either at configuration time or dynamically by a component that is responsible for determining the load on the database.

In step 503, the content throttler determines whether the request should be admitted based on the current value of the response time, a measurement continuously being done by the system as a measurement of current activity for the backend database. If the current response time is less than the threshold that has been set then the request is admitted (step 504). Otherwise, the request is dropped (step 505).

The alternative route shown in step 502 refers to a "request for CPU bound CGI script". As explanation of this alternative, the web server configuration contains request types. This request type (CGI) can be considered as a coarse grained request. The request type classification used by the content throttler can be considered a finer grained classification within a single request type identified by the web server configuration. The "request for CPU bound CGI script" depicts this classification. This is only one illustration of a process of classification of the requests.

Another example of a content throttler might be based on the size of the output being generated for requests to images stored in a repository. The throttler obtains the size of the image from the repository and, if the size of the image is less than a threshold size, then it may decide to admit the request. Otherwise, it may choose to send a custom HTML page refusing the admission of request. Note that these are only several of the algorithms possible for the throttling decision. Other algorithms could be used to arrive at the throttling decision, as would be apparent to one skilled in the art, taking the present disclosure as a whole.

The embodiment described above is distributed in nature, as the throttling is performed at every web server in the system. This approach is different from the conventional systems and methods where the admittance control decisions are made at the level of L4LB which is a central entity. Content based routing (CBR) which is sometimes implemented on top of L4LB routes requests to web servers based on the content. Implementations of CBR make use of a set of rules to match URL's with the rules and tend to be bottlenecks as they inspect every request that arrives to the web site.

Figure 7:
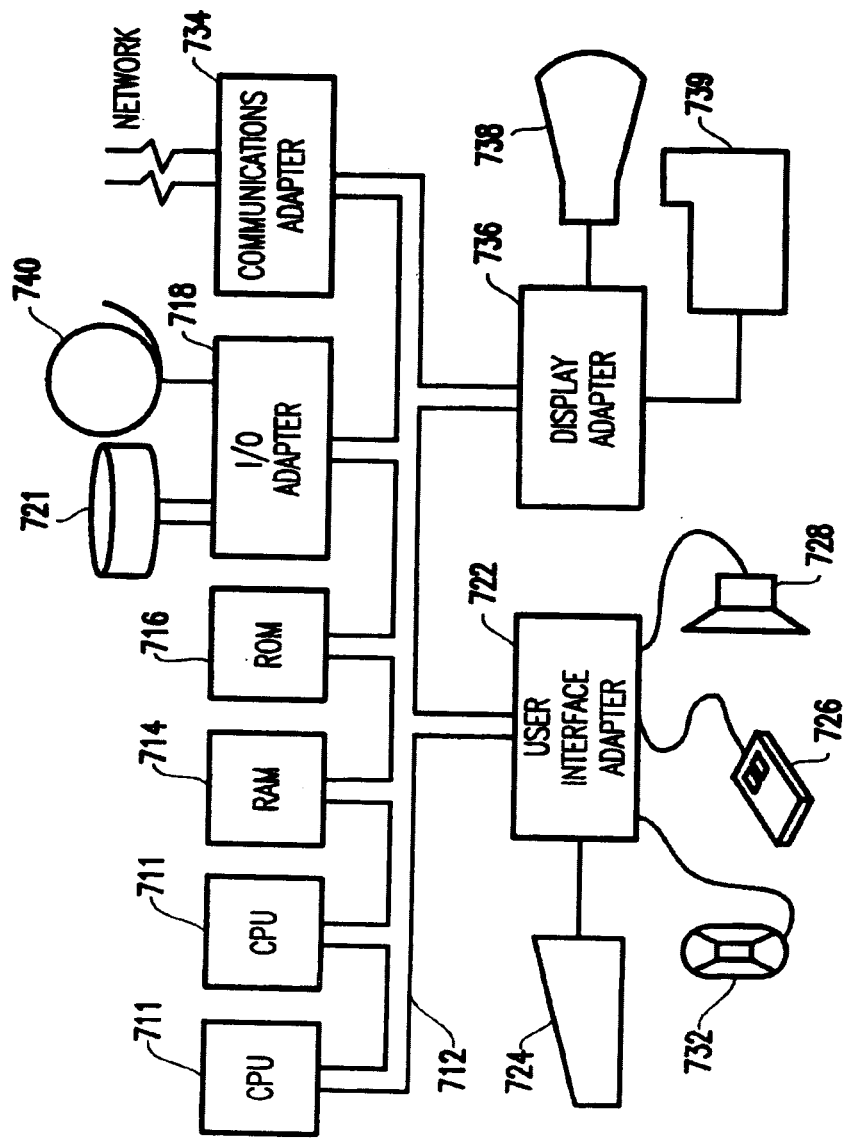
FIG. 7 illustrates an exemplary hardware/information handling system 700 for incorporating the present invention therein.

FIG. 7 illustrates a typical hardware configuration of an information handling/computer system in accordance with the invention and which preferably has at least one processor or central processing unit (CPU) 711.

The CPUs 711 are interconnected via a system bus 712 to a random access memory (RAM) 714, read-only memory (ROM) 716, input/output (I/O) adapter 718 (for connecting peripheral devices such as disk units 721 and tape drives 740 to the bus 712), user interface adapter 722 (for connecting a keyboard 724, mouse 726, speaker 728, microphone 732, and/or other user interface device to the bus 712), a communication adapter 734 for connecting an information handling system to a data processing network, the Internet, an Intranet, a personal area network (PAN), etc., and a display adapter 736 for connecting the bus 712 to a display device 738 and/or printer 739 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 711 and hardware above, to perform the method of the invention.

Figure 8:
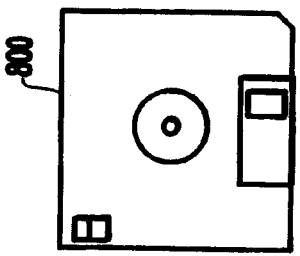
FIG. 8 illustrates a signal bearing medium 800 (e.g., storage medium) for storing steps of a program of a method according to the present invention.

This signal-bearing media may include, for example, a RAM contained within the CPU 711, as represented by the fast-access storage for example. Alternatively, the instructions may be contained in another signal-bearing media, such as a magnetic data storage diskette 800 (FIG. 8), directly or indirectly accessible by the CPU 711.

Whether contained in the diskette 800, the computer/CPU 711, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code, compiled from a language such as "C", etc.

The invention as described above provides a number of benefits to web servers. It provides overload protection of backend servers. Its distributed aspect of throttling improves the efficiency of the system and its improved load management provides possible improvement in throughput of back-end servers. The invention is particularly beneficial to web hosting server farms.

While the invention has been described in terms of a single preferred embodiment, those skilled in the art will recognize that the invention can be practiced with modification within the spirit and scope of the appended claims.

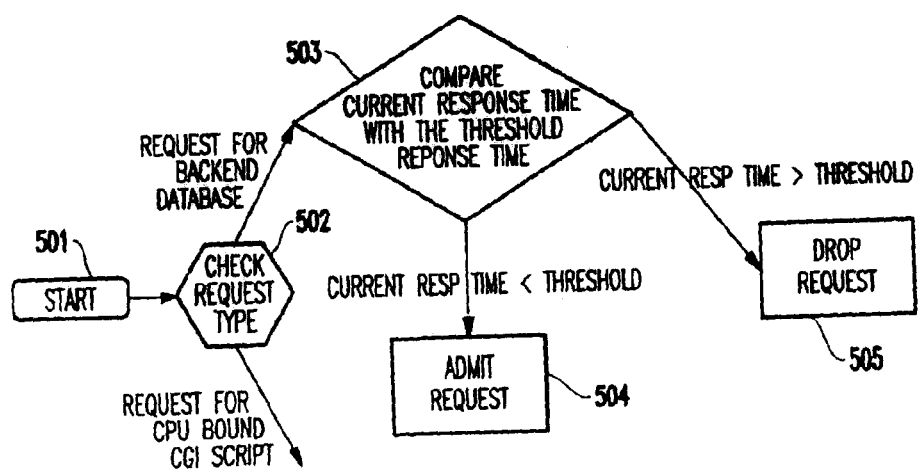

The invention claimed is:

1. A method in a computer network of controlling an admittance of requests to at least one processing component, said method comprising:
    evaluating an amount of traffic in said network;
    determining whether said amount exceeds a preset threshold;
    if said amount exceeds said threshold, differentiating a type of said requests based on a content in each said request; and
    admitting said each request only if said differentiated type meets at least one criterion for admission.

2. The method of claim 1, further comprising:
    returning a message to a sender of each said request not admitted.

3. The method of claim 1, further comprising:
    evaluating at least one criterion in said computer network; and
    performing said differentiation based on said evaluation.

4. The method of claim 1, wherein said method is embodied in a software program, wherein said admittance to said at least one processing component is gained through one or more entry points, said method further comprising:
    activating said software program in at least one of said one or more entry points.

5. The method of claim 4, wherein said at least one processing component comprises a plurality of processing components, said at least one or more entry points comprises a plurality of web servers, and said activation of said software program occurs in each web server in said plurality of web servers, thereby providing an admittance method that is distributed.

6. The method of claim 4, wherein said software program comprises a plugin software module.

7. The method of claim 3, wherein said at least one evaluation criterion comprises a measurement of activity on said network.

8. The method of claim 7, wherein said measurement of activity comprises a measurement of requests to said at least one processing component.

9. The method of claim 1, wherein said at least one criterion for admission comprises evaluation of a response time for said request.

10. The method of claim 1, further comprising:
    prioritizing said requests within a same type, based on further refinement of said content.

11. The method of claim 1, wherein said computer network comprises a distributed heterogeneous computing environment having a dependency of said processing components represented.

12. The method of claim 11, further comprising:
    determining a load imposed on a dependee processing component.

13. The method of claim 12, wherein said load determination is performed in a central location.

14. The method of claim 12, wherein said at least one criterion for admission comprises said determined load on said dependee component.

15. The method of claim 1, further comprising:
    associating a user defined response with selected ones of said requests that are not admitted.

16. The method of claim 11, wherein said admission control is applied at a tier to control admittance to a next processing component along a request flow path.

17. A method of claim 11, where said at least one criterion for admission comprises a determination that a dependee processing component is not currently available.

18. The method of claim 1, further comprising:
determining a load of a target processing component; and
altering a normal response to a request based on said load determination.

19. The method of claim 1, wherein said admitting of said each request is distributed.

20. A request throttler in a computer network that controls an admittance of requests to at least one processing component, said request throttler comprising:
a threshold detector to determine whether an activity on said computer network exceeds a preset amount;
a differentiator to evaluate a message content of each of said requests, if said preset amount is exceeded; and
a switch to admit said each request only if said evaluation passes at least one criterion for admission.

21. The request throttler of claim 20, wherein said differentiator and said switch comprise a set of computer instructions.

22. The request throttler of claim 21, wherein said set of computer instructions comprises a software plugin.

23. The request throttler of claim 20, wherein said differentiator and said switching functions are distributed in said network.

24. A computer-readable medium containing a set of computer-readable instructions for a method in a computer network of controlling an admittance of requests to at least one processing component, said method comprising:
determining whether an amount of network traffic exceeds a preset amount;
if said preset amount is exceeded, differentiating a type of said requests based on a content in each said request; and
admitting said each request only if said differentiated type meets at least one criterion for admission.

25. A computer network comprising:
a request throttler for controlling an admittance of requests to at least one processing component and comprising a differentiator to evaluate a message content of each of said requests and a switch to admit said each request only if said evaluation passes at least one criterion for admission, wherein said request throttler is invoked only if an amount of traffic on said computer network exceeds a preset amount.

26. The method of claim 1, wherein said admittance of said requests is handled by a content handler when said amount of traffic is below said preset threshold, said content handler comprising a Layer 4 Load Balancing (L4LB) component to distribute said requests as based on a Uniform Request Locator (URL) rather than an information content of said requests.

27. The request throttler of claim 20, further comprising:
a content handler that handles said requests when said amount of traffic is below said preset threshold, said content handler comprising a Layer 4 Load Balancing (L4LB) component to distribute said requests as based on a Uniform Request Locator (URL) rather than an information content of said requests.

* * * * *

UNITED STATES PATENT AND TRADEMARK OFFICE
CERTIFICATE OF CORRECTION

PATENT NO. : 7,032,048 B2
APPLICATION NO. : 09/916513
DATED : April 18, 2006
INVENTOR(S) : Karen Appleby et al.

It is certified that error appears in the above-identified patent and that said Letters Patent is hereby corrected as shown below:

Delete the title page and substitute therefore the attached title page.

Delete the Drawing Sheets 1-7 and substitute therefore the attached Drawing Sheets 1-7.

Signed and Sealed this

Twenty-first Day of November, 2006

JON W. DUDAS
*Director of the United States Patent and Trademark Office*

(12) United States Patent
Appleby et al.

(10) Patent No.: US 7,032,048 B2
(45) Date of Patent: Apr. 18, 2006

(54) METHOD, SYSTEM, AND PROGRAM PRODUCTS FOR DISTRIBUTED CONTENT THROTTLING IN A COMPUTING ENVIRONMENT

(75) Inventors: Karen Appleby, Ossining, NY (US); Liana Liyow Fong, Irvington, NY (US); German Sergio Goldszmidt, Dobbs Ferry, NY (US); Srirama Mandyam Krishnakumar, White Plains, NY (US); Donald Philip Pazel, Montrose, NY (US)

(73) Assignee: International Business Machines Corporation, Armonk, NY (US)

( * ) Notice: Subject to any disclaimer, the term of this patent is extended or adjusted under 35 U.S.C. 154(b) by 465 days.

(21) Appl. No.: 09/916,513

(22) Filed: Jul. 30, 2001

(65) Prior Publication Data

US 2003/0023798 A1    Jan. 30, 2003

(51) Int. Cl.
*G06F 13/14* (2006.01)

(52) U.S. Cl. .................. 710/240; 710/309; 370/230

(58) Field of Classification Search ........ 710/240–244, 710/100, 309; 709/226, 225, 229, 235, 200, 709/202–204; 718/105; 370/230–235
See application file for complete search history.

(56) References Cited

U.S. PATENT DOCUMENTS

| | | |
|---|---|---|
| 5,864,870 A | 1/1999 | Guck |
| 5,918,017 A | 6/1999 | Attanasio et al. |
| 5,926,798 A | 7/1999 | Carter |
| 5,961,602 A | 10/1999 | Thompson et al. |
| 6,006,264 A * | 12/1999 | Colby et al. ............... 709/226 |
| 6,067,559 A | 5/2000 | Allard et al. |
| 6,073,241 A | 6/2000 | Rosenberg et al. |
| 6,434,609 B1 * | 8/2002 | Humphrey ................ 709/218 |
| 6,480,881 B1 * | 11/2002 | Kubota et al. ............. 709/202 |
| 6,526,448 B1 * | 2/2003 | Blewett ..................... 709/238 |
| 6,598,071 B1 * | 7/2003 | Hayashi et al. ............ 709/203 |
| 6,667,956 B1 * | 12/2003 | Beshai et al. .............. 370/238 |
| 6,839,767 B1 * | 1/2005 | Davies et al. ............. 709/232 |
| 2001/0049727 A1 * | 12/2001 | Mukherjee et al. ........ 709/219 |
| 2002/0091825 A1 * | 7/2002 | Shuster .................... 709/226 |

OTHER PUBLICATIONS

Boivie et al. "System and Method for Enforcing Communications Bandwidth Based Service Level Agreements to Plurality of Customers Hosted on a Clustered Web Service", U.S. Appl. No. 09/943,207.

Appleby-Hougham et al., "Highly Scalable System and Method of Regulating Internet Traffic to Server Farm To Support (MIN, MAX) Bandwidth Usage-Based Service Level Agreement", U.S. Appl. No. 09/543,207.

* cited by examiner

*Primary Examiner*—Rehana Perveen
*Assistant Examiner*—Kim T. Huynh
(74) *Attorney, Agent, or Firm*—McGinn IP Law Group, PLLC; Douglas W. Cameron, Esq.

(57) ABSTRACT

A method (and structure) in a computer network of controlling the admittance of requests to at least one processing component, includes differentiating the type of received requests based on the message content in each request. Each request is admitted only if the differentiated type meets at least one criterion for admission.

27 Claims, 7 Drawing Sheets